United States Patent
McMillan et al.

(10) Patent No.: US 11,820,527 B2
(45) Date of Patent: Nov. 21, 2023

(54) REDUNDANT ACTUATION POWER AND CONTROL

(71) Applicant: CRANE CO., Stamford, CT (US)

(72) Inventors: Scott McMillan, Woodland Hills, CA (US); Bennie Garcia, Granada Hills, CA (US); Kourosh Afshari, Woodland Hills, CA (US); Ary Geuvdjelian, Tarzana, CA (US)

(73) Assignee: CRANE CO., Stamford, CT (US)

( * ) Notice: Subject to any disclaimer, the term of this patent is extended or adjusted under 35 U.S.C. 154(b) by 0 days.

(21) Appl. No.: 17/847,052

(22) Filed: Jun. 22, 2022

(65) Prior Publication Data

US 2022/0315239 A1    Oct. 6, 2022

Related U.S. Application Data

(62) Division of application No. 16/858,532, filed on Apr. 24, 2020, now Pat. No. 11,396,380.

(Continued)

(51) Int. Cl.
| | |
|---|---|
| *B64D 41/00* | (2006.01) |
| *H02J 4/00* | (2006.01) |
| *B64D 11/06* | (2006.01) |

(52) U.S. Cl.
CPC .......... *B64D 41/00* (2013.01); *B64D 11/0639* (2014.12); *H02J 4/00* (2013.01); *B64D 2221/00* (2013.01); *H02J 2310/44* (2020.01)

(58) Field of Classification Search
None
See application file for complete search history.

(56) References Cited

U.S. PATENT DOCUMENTS

| | | |
|---|---|---|
| 4,607,330 A | 8/1986 | McMurray et al. |
| 5,422,517 A | 6/1995 | Verney et al. |

(Continued)

FOREIGN PATENT DOCUMENTS

| | | |
|---|---|---|
| DE | 10 2015 216 597 A1 | 3/2017 |
| EP | 1 028 512 B2 | 8/2000 |
| JP | 61-081132 | 4/1986 |

OTHER PUBLICATIONS

International Search Report and Written Opinion for International Application No. PCT/US2020/029956, dated Aug. 13, 2020.

*Primary Examiner* — Jared Fureman
*Assistant Examiner* — Aqeel H Bukhari
(74) *Attorney, Agent, or Firm* — Lewis Roca Rothgerber Christie LLP

(57) ABSTRACT

A redundant power supply system for aircraft seats, includes: a first power supply module having a first AC to DC power converter configured to supply power to a first auxiliary board, the first auxiliary board being configured to supply power to a plurality of aircraft seats via a plurality of communication bus channels; a second power supply module having a second AC to DC power converter configured to supply power to a second auxiliary board, the second auxiliary board being configured to supply power to the plurality of aircraft seats via the plurality of communication bus channels; and a power supply link configured to connect the first auxiliary board and the second auxiliary board enabling the first AC to DC power converter to power the second auxiliary board via the power supply link.

8 Claims, 11 Drawing Sheets

Related U.S. Application Data

(60) Provisional application No. 62/839,516, filed on Apr. 26, 2019.

(56) References Cited

U.S. PATENT DOCUMENTS

| | | |
|---|---|---|
| 5,583,419 A | 12/1996 | Haller |
| 6,856,045 B1 | 2/2005 | Beneditz et al. |
| 8,369,295 B2 | 2/2013 | Thompson |
| 2004/0031882 A1 | 2/2004 | Wagner |
| 2004/0181295 A1 | 9/2004 | Wagner |
| 2008/0157997 A1 | 7/2008 | Bleacher et al. |
| 2008/0266171 A1 | 10/2008 | Weber et al. |
| 2015/0123464 A1 | 5/2015 | Hess |
| 2015/0360630 A1 | 12/2015 | Rideau et al. |
| 2020/0055612 A1* | 2/2020 | Delame .................. B64D 41/00 |
| 2020/0231288 A1 | 7/2020 | Blumer et al. |

\* cited by examiner

REDUNDANT ACTUATION POWER AND CONTROL

CROSS-REFERENCE TO RELATED APPLICATION(S)

This application is a divisional application of U.S. patent application Ser. No. 16/858,532, filed Apr. 24, 2020, which claims the benefit of U.S. Provisional Patent Application No. 62/839,516, filed Apr. 26, 2019, the entire content of each of which is incorporated herein by reference.

FIELD OF INVENTION

Aspects of embodiments of the present disclosure relate to power systems for aircraft seat actuation systems.

BACKGROUND

Modern aircraft seat design frequently entails powering one or more passenger seats via a power supply unit while also seeking to reduce or minimize the amount of componentry required so as to reduce weight and the number of possible failure modes. Therefore, it is advantageous to provide redundancy for the supply of power to the passenger seat actuators and other various devices connected to the passenger seat while also seeking to reduce the number of component parts within the power supply system. Additionally, where possible, it is advantageous to create power supply designs that can be utilized in a redundant manner with devices, i.e., connected seat actuators and peripherals, that may incorporate additional microcontrollers for each device. Such a design allows for greater flexibility when evaluating what componentry may be utilized within the design while decreasing cost and complexity of design.

Designs for aircraft seat power supplies should also advantageously offer flexibility, in regards to the topology of the power supply circuitry, to allow for different Design Assurance Levels (DAL) to be utilized according to the needs of the design. For example, if an airline has requirements that all the actuators of a passenger seat meet a specific DAL, it is advantageous if the power supply design can support that DAL while also meeting the above-mentioned design objectives.

Aspects of embodiments of the present disclosure relate to systems and methods to allow multiple seats to be powered and controlled by a redundant plurality (e.g., a pair) of power supplies. Aspects of embodiments of the present disclosure describe the electrical architecture in which a multiple seat system with redundant power supplies may be connected in order to support full redundant capability while also reducing the required componentry of the system thereby saving weight and reducing potential failure modes. Some aspects of embodiments of the present disclosure describe the mechanism for determining which power supply in a pair of redundant power supplies connected to a Control Area Network (CAN) bus containing actuators should be the active power supply in terms of power supply and communication at any one time. Aspects of embodiments of the present disclosure describe a method in which a matrix scan passenger control unit can be connected to both of a redundant pair of power supplies in order to support full redundant control. Aspects of embodiments of the present disclosure describe the electrical design and operation of the matrix scan electronics in the redundant power supply to support full redundant control. Other aspects of embodiments of the present disclosure describe the method by which the redundant power supplies would be connected to a peer system, such as an In-Flight Entertainment system, such that the redundant capability and fail over characteristics are transparent to the operation of the peer system. Aspects of embodiments of the present disclosure also describe the use of passenger controls and suite peripherals being designed and certified at a different Design Assurance Level (DAL) than the core actuation components in order to increase the flexibility of designs to make use of componentry certified at varying DAL ratings.

The above information disclosed in this Background section is only for enhancement of understanding of the background of the invention, and therefore it may contain information that does not form the prior art that is already known to a person of ordinary skill in the art.

SUMMARY

According to one embodiment, a redundant power supply system for aircraft seats, includes: a first power supply module having a first AC to DC power converter configured to supply power to a first auxiliary board, the first auxiliary board being configured to supply power to a plurality of aircraft seats via a plurality of communication bus channels; a second power supply module having a second AC to DC power converter configured to supply power to a second auxiliary board, the second auxiliary board being configured to supply power to the plurality of aircraft seats via the plurality of communication bus channels; and a power supply link configured to connect the first auxiliary board and the second auxiliary board enabling the first AC to DC power converter to power the second auxiliary board via the power supply link.

According to one embodiment, the redundant power supply system for aircraft seats may be configured such that the first power supply module is configured to power the first auxiliary board and the plurality of aircraft seats as a primary power supply module.

According to one embodiment, the redundant power supply system for aircraft seats may be configured such that the second auxiliary board is configured to: monitor the performance of the first power supply module; and in response to detecting a decline in the performance of the first power supply module, begin powering one or more of the plurality of aircraft seats via the second power supply module.

According to one embodiment, the redundant power supply system for aircraft seats may be configured such that the second auxiliary board is configured to: monitor a signal on each of the plurality of communication bus channels; and in response to detecting a loss of the signal on one or more of the plurality of communication bus channels, begin powering one or more of the plurality of aircraft seats.

According to one embodiment, the redundant power supply system for aircraft seats further includes: a first logic circuit located within the first auxiliary board and configured to monitor a performance of the redundant power supply system; and a second logic circuit located within the second auxiliary board, wherein the first logic circuit is communicatively linked to the second logic circuit via the power supply link, and the communication bus channels, and the second logic circuit is configured to assume control of monitoring the performance of the redundant power supply system from the first logic circuit after receiving a signal via the power supply link or the communication bus channels from the first logic circuit.

According to one embodiment, a redundant power supply system for aircraft seats includes: a first power supply module having a first AC to DC power converter and a first auxiliary board configured to supply power to a plurality of aircraft seats via a plurality of communication bus channels; a second power supply module having a second AC to DC power converter and a second auxiliary board configured to supply power to the plurality of aircraft seats via the plurality of communication bus channels; and a power supply link configured to connect the first AC to DC power converter and the second AC to DC power converter enabling the first AC to DC power converter to power one or both of the first and second auxiliary boards.

According to one embodiment, a redundant power supply system for aircraft seats and accessory inputs includes: a matrix keypad having a plurality of conductive lines and a plurality of switches; a primary power supply module including: a first plurality of matrix scan outputs configured to supply signals to the plurality of conductive lines of the matrix keypad; and a first plurality of matrix scan inputs configured to receive the signals from the matrix scan outputs when one or more of the plurality of switches of the matrix keypad are activated; and a secondary power supply module including: a second plurality of matrix scan outputs configured to monitor the signals supplied on the plurality of conductive lines by the first plurality of matrix scan outputs; and a second plurality of matrix scan inputs configured to remain in an inactive state, wherein the secondary power supply module is configured to, upon the detection by the second plurality of matrix scan outputs of a signal dropout from the primary power supply module: supply the signals to the plurality of conductive lines of the matrix keypad via the second plurality of matrix scan outputs; and set the second plurality of matrix scan inputs into an active state allowing for the signals to be received by the second plurality of matrix scan inputs via the plurality of conductive lines when one or more of the plurality of switches of the matrix keypad are activated.

According to one embodiment, the redundant power supply system for aircraft seats and accessory inputs may be configured such that the secondary power supply module is further configured to, upon the detection by the second plurality of matrix scan outputs of a signal dropout from the primary power supply module: control, via a power supply link, the primary power supply module to set the first plurality of matrix scan outputs to monitor the signals; and control, via the power supply link, the primary power supply module to set the first plurality of matrix scan inputs into an inactive state.

According to one embodiment, the redundant power supply system for aircraft seats and accessory inputs may be configured such that the plurality of conductive lines and the plurality of switches of the matrix keypad are arranged to form a matrix having a plurality circuits, each circuit in the matrix including one of the plurality of switches and being configured to close upon the activation of the corresponding switch.

According to one embodiment, the redundant power supply system for aircraft seats and accessory inputs may be configured such that the first plurality of matrix scan outputs and the first plurality of matrix scan inputs are configured to scan the matrix keypad to detect the switch activations while the second plurality of matrix scan inputs remains in the inactive state.

According to one embodiment, the redundant power supply system for aircraft seats and accessory inputs may be configured such that the second plurality of matrix scan outputs and the second plurality of matrix scan inputs are configured to scan the matrix keypad to detect the switch activations while the first plurality of matrix scan inputs is in the inactive state.

According to one embodiment, the redundant power supply system for aircraft seats and accessory inputs may be configured such that the first and second plurality of matrix scan inputs are configured to have a number of individual inputs corresponding to a number of columns of the matrix keypad.

According to one embodiment, the redundant power supply system for aircraft seats and accessory inputs may be configured such that the second plurality of matrix scan outputs monitors the one or more signals supplied by the first plurality of matrix scan outputs by sampling the signals at a set frequency.

According to one embodiment, the redundant power supply system for aircraft seats and accessory inputs may be configured such that the first and second plurality of matrix scan inputs are configured to sample the signals at a set frequency.

According to one embodiment, the redundant power supply system for aircraft seats and accessory inputs may be configured such that each of the primary and secondary power supply modules include an AC to DC power converter and an auxiliary board, the auxiliary boards being coupled together via the power supply link.

According to one embodiment, the redundant power supply system for aircraft seats and accessory inputs may be configured such that the first and second plurality of matrix scan outputs are configured to sequentially scan the rows of the matrix keypad upon the detection of a switch activation by the first or second plurality of matrix scan inputs.

According to one embodiment, the redundant power supply system for aircraft seats and accessory inputs may be configured such that the active state corresponds to a low input impedance state, and wherein the inactive state corresponds to a high input impedance state.

According to one embodiment, the redundant power supply system for aircraft seats and accessory inputs may be configured such that the inactive state corresponds to a high input impedance state.

According to one embodiment, a method for providing redundant matrix scan functionality to a matrix keypad including a plurality of switches, includes: sending, by a first power supply module, a control voltage signal to a second power supply module; detecting, by the first power supply module, an input to one of the plurality of switches of the matrix keypad; scanning, by the first power supply module, the matrix keypad in a sequence enabling the determination which one of a plurality of switches was depressed via a sequence of scanned signals sent across a first plurality of matrix scan outputs and a first plurality of matrix scan inputs; receiving, by the second power supply module, the control voltage signal from the first power supply module; detecting, by the second power supply module, a loss of the control voltage signal; assuming, by the second power supply module, control of the matrix scan operations for the matrix keypad by monitoring and sending scanning signals from a second plurality of matrix scan outputs; setting, by the secondary power supply module, a second plurality of matrix scan inputs to go from an inactive state to an active state enabling the second plurality of matrix scan inputs to receive signals from the second plurality of matrix scan outputs; sending, by the second power supply module, a signal to the first power supply module to put the first plurality of matrix scan inputs into the inactive state.

According to one embodiment, a redundant power supply system for a plurality of passive aircraft seat peripherals includes: a first power supply module having a first AC to DC power converter and a first auxiliary board configured to supply power to a plurality of passive aircraft seat peripherals via a plurality of communication bus channels; a second power supply module having a second AC to DC power converter and a second auxiliary board configured to supply power to the plurality of passive aircraft seat peripherals via the plurality of communication bus channels; and a power supply link configured to connect the first AC to DC power converter and the second AC to DC power converter enabling the first AC to DC power converter to power one or both of the first and second auxiliary boards.

According to one embodiment, the redundant power supply system for a plurality of passive aircraft seat peripherals may be configured such that the second power supply module is configured to, in response to receiving a signal via the plurality of communication bus channels that the first power supply module has experienced a failure, assume control of supplying power to the plurality of passive aircraft seat peripherals using the second auxiliary board.

According to one embodiment, the redundant power supply system for a plurality of passive aircraft seat peripherals may be configured such that the second power supply module is configured to, in response to receiving a signal via the power supply link that the first power supply module has experienced a failure, assume control of supplying power to the plurality of passive aircraft seat peripherals using the second auxiliary board.

BRIEF DESCRIPTION OF THE DRAWINGS

The accompanying drawings, together with the specification, illustrate example embodiments of the invention, and, together with the description, serve to explain the principles of the invention.

DETAILED DESCRIPTION

Figure 1:
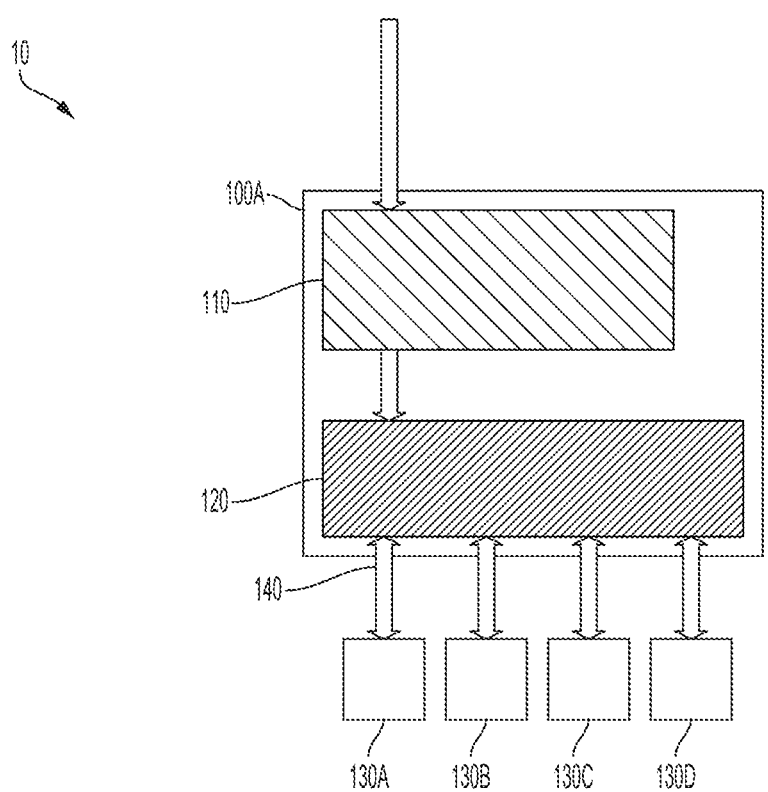
FIG. 1 is a representation of a power supply module connected to a series of passenger seats (PAXs) that does not feature redundancy.

In the following detailed description, only certain exemplary embodiments of the invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

Modern aircraft seat design frequently involves seats that have powered actuators and other connected peripherals, such as lights, heaters and other passenger comfort enhancing devices, which require a source of DC current. Typically, this involves a power supply unit configured to convert the AC current being supplied by the aircraft (e.g., from an electrical alternator or generator connected to the engines) into DC current that can be supplied to the passenger seats. Depending on the constraints upon the design, such as meeting specified Design Assurance Levels (DAL) or other requirements that manufacturers might have for their aircraft seats, a power supply unit may provide power to one or more passenger seats at a time.

However, as the power requirement for aircraft seats becomes increasingly important, so too does the need for increased reliability in design of the power supply circuitry. In particular, it is important to reduce the number of passenger seats that will be left without power due to a failure of a single component within the power supply system. To provide redundancy, designs generally either increase the number of power supply units so as to power fewer passenger seats per power supply, which increase the weight of the system and adds additional failure modes due to the increased number of components, or incorporate redundancy into the power supply design. Generally, incorporating redundancy into the power supply design rather than increasing the number of power supplies reduces the number of components and thus saves weight and reduces possible failure modes, both of which are important design goals for aircraft seat design.

Aspects of embodiments of the present disclosure relate to redundant designs for power supply circuit topology. Specifically, aspects of embodiments of the present disclosure are directed towards designs that incorporate partial redundancy, i.e., designs that can continue to operate all of the passenger seats connected to the power supply given a failure of a single component within most of the power supply circuit, or fully redundant power supply designs that can withstand a single component failure of any of the components within the power supply circuitry. Because the failure rates for the individual components of the power supply systems are relatively low, it is expected that there will typically not be more than one failure at a time within a single power supply circuit. Therefore, partial or fully redundant designs may advantageously offer increased reliability with the additional benefit of decreasing overall system weight and complexity.

Aspects of embodiments of the present disclosure are directed at designs which incorporate multiple power supply units connected so as to allow for a primary power supply and a secondary power supply to be present within the system, and to allow for the secondary power supply to assume control from the primary power supply when a failure or recline in system performance is detected in the primary power supply. Additionally, the power supply system may be configured to be communicatively connected to a peer system, such as an in-flight entertainment system (IFE), to indicate to maintenance crews for the aircraft that the primary power supply has failed. It will be understood by those skilled in the art that the power supply system may be connected via any suitable means to the peer system. This may include having both the primary and the secondary power supply modules connected to the peer system, so that a redundant communication channel is created that may allow for the secondary power supply module to assume control of communication with the peer system in the event of a failure in the primary power supply module. The connection between the power supplies is produced using a power supply link that connects the auxiliary boards within a pair of power supply modules, with each module having a power supply and auxiliary board within it.

The auxiliary boards include a plurality of communication bus channels, for example CAN bus channels, as well as circuitry for monitoring the performance of the connected power supplies. For simplicity, all communication bus channels will be referred to herein as CAN bus channels although other types of communication bus channels may be used within the scope of the present disclosure. Additional circuitry, as described in more detail below, allows for the redundant monitoring of controls from inputs using a matrix scan technique. By connecting the power supply modules at their respective auxiliary boards using a power supply link, at least a partially redundant configuration can be produced. Such a configuration is described in more detail below in relation to FIG. 2. A redundant configuration, capable of tolerating a fault of any one component and still being able to to provide power to the passenger seats, can be produced by connecting not only the auxiliary boards via a power supply link but by also connecting the passenger seats to corresponding CAN bus channels for each auxiliary board. Such a configuration is described below in more detail in relation to FIG. 3A. Additionally, a configuration including the redundant communication channels connecting the power supply modules to the peer system is depicted in FIG. 3C.

FIG. 1 is a representation of a passenger seat power supply system 10 configured with no redundancy. The system 10 contains only a single power supply module 100A, which contains both the AC/DC power supply 110 and the auxiliary board 120. A plurality of passenger seats 130A-D are connected to the auxiliary board 120 via CAN bus channels 140. As depicted, each passenger seat 130 may have its own CAN bus channel 140, however such a configuration is not required and multiple passenger seats 130 may share a CAN bus channel 140. This configuration suffers from a lack of redundancy, in that a failure of either the AC power in, the power supply 110, or the auxiliary board 120 will bring all of the connected passenger seats 130A-D offline. As depicted, a failure of any one of those components within this configuration would leave all four connected passenger seats 130A-D without power.

Figure 2:
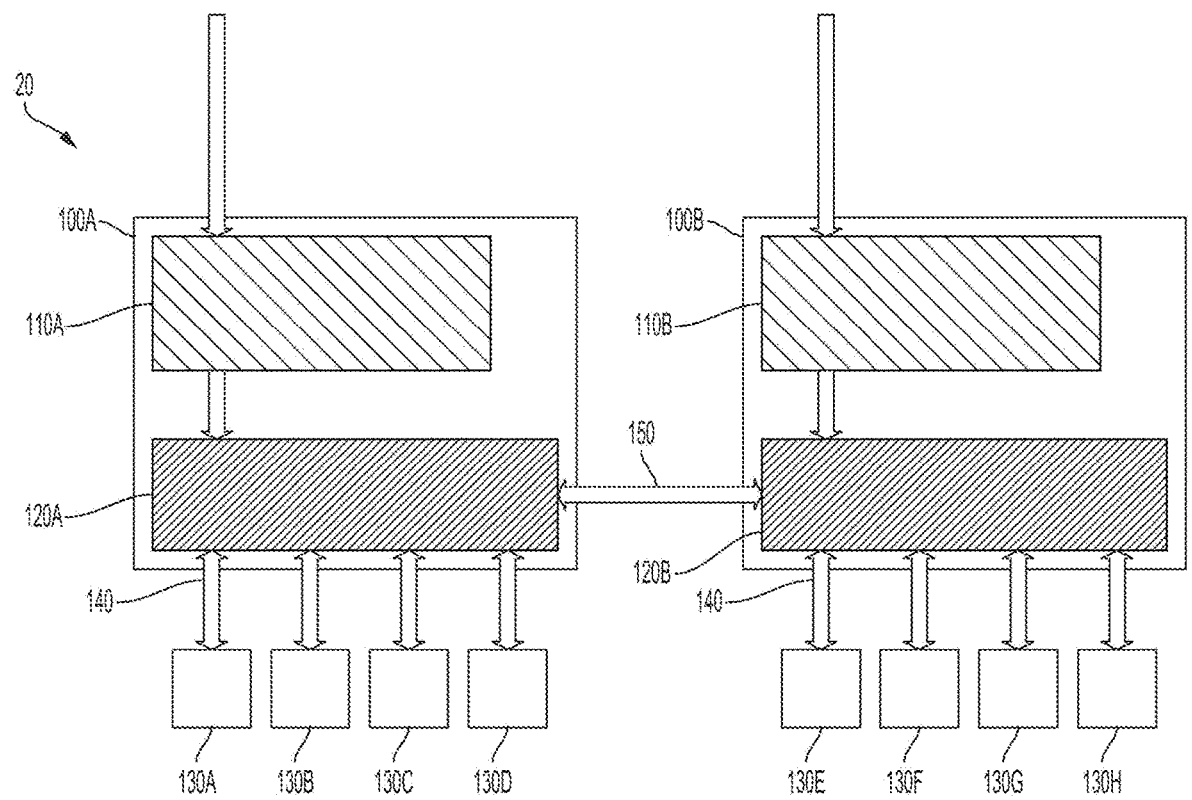
FIG. 2 is a representation of a pair of power supply modules connected to a plurality of passenger seats (PAXs) that features partial redundancy according to an embodiment of the present disclosure.

FIG. 2 is a representation of a partially redundant power supply system 20 including two power supply modules (primary power supply module 100A and secondary power supply module 100B) connected at their respective auxiliary boards, 120A and 120B, via a power supply link 150. Herein, it will be assumed for simplicity that power supply module 100A and its component parts are the "primary" power supply, and that power supply module 1006 and its component parts will be the "secondary" power supply. However, this designation is for simplicity only, and the functionality of the power supplies could be reversed within the scope of the present disclosure. Moreover, it should be noted that the designations "primary" and "secondary" refer only to the respective roles that the components operate within as part of the redundant power supply system 30. The term "backup" would be analogous to the use of "secondary" within the present disclosure. Likewise, the terms "first" and "second" are used herein to refer to the paired sets of components contained within linked primary power supply module 100A and secondary power supply module 1006. Component parts within each of the primary power supply module 100A and secondary power supply module 1006 are intended to be interchangeable.

In this configuration, a failure of any one of the primary power supply 110A or secondary power supply 1106 or the AC power in to either power supply module can be mitigated by directing power to the passenger seats 130A-H via the remaining power supply circuit that does not have a component failure. For example, if primary power supply 110A were to experience a failure, power could be directed from secondary power supply module 100B via the power supply link 150 to the primary auxiliary board 120A of primary power supply module 100A and then distributed via CAN bus channels 140 to passenger seats 130A-D. This configuration offers benefits of improved reliability over that of the power supply system 10 of FIG. 1, but it does not provide "full" redundancy because a failure of one of either the primary auxiliary board 120A or secondary auxiliary board 120B would leave those passenger seats 130 connected to the failing auxiliary board without power. Therefore, it is advantageous to design a power supply circuit topology that increases the connectivity between primary power supply module 100A and secondary power supply module 100B to improve upon the system redundancy.

Figure 3A:
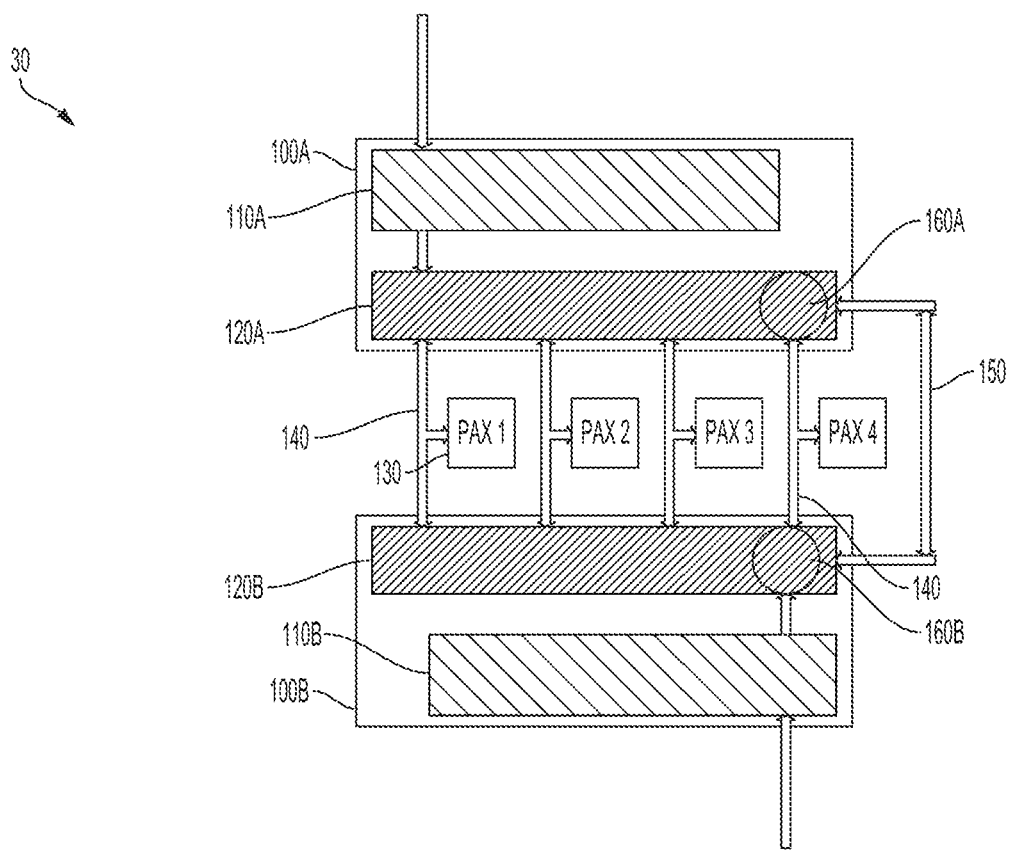
FIG. 3A is a representation of a pair of power supply modules connected to a plurality of passenger seats (PAXs) that features full redundancy according to an embodiment of the present disclosure.

FIG. 3A is a representation of a redundant power supply system 30 according to one embodiment of the present disclosure. Similar to the arrangement shown in FIG. 2, primary auxiliary board 120A and secondary auxiliary board 120B are connected via a power supply link 150. However, in the arrangement shown in FIG. 3A, each of the passenger seats 130 are connected along a corresponding one of the plurality of CAN bus channels 140 that form communicative channels or links between primary auxiliary board 120A and secondary auxiliary board 120B. This configuration provides that each of the passenger seats 130 is connected to both the primary auxiliary board 120A and the secondary auxiliary board 120B concurrently, which may enable redundancy for powering the passenger seats 130 down to the auxiliary board level. Redundancy is increased by using the shared CAN bus channels 140 between primary auxiliary board 120A and secondary auxiliary board 120B. This configuration also supports the connection of multiple passenger seats 130 per CAN bus channel 140, although for simplicity this is not depicted in FIG. 3A. Also not depicted is a communicative connection between the power supply system 30 and a peer system such as an IFE, however such a depiction is later provided in FIG. 3C.

Once the power supply system 30 circuitry has been connected, there remains a need for monitoring the performance of the primary components, and for shifting control over powering the passenger seats 130 to the secondary components should a failure or performance decline be detected within the primary power supply module 100A. Control and monitoring functions may be performed by logic circuitry, depicted as primary logic circuity 160A and secondary logic circuitry 160B, that may be included within the corresponding primary auxiliary board 120A or secondary auxiliary board 120B. Primary logic circuitry 160A and secondary logic circuitry 160B may be implemented using, for example, a microprocessor, a microcontroller, an application specific integrated circuit (ASIC), a field programmable gate array (FPGA) or the like as would be known to one skilled in the art.

The primary logic circuitry 160A may also be responsible for monitoring and scanning a matrix keypad, described in greater detail below, and this functionality may be monitored and taken over by the secondary logic circuitry 160B if a failure is detected. Within the context of powering the passenger seats 130, the primary logic circuitry 160A may be responsible for monitoring the performance of the primary power supply 110A and also sending signals to the secondary auxiliary board 120B regarding performance of the primary power supply module 100A. The secondary logic circuitry 160 monitors the signals received from the primary auxiliary board 120A, and may be set to assume control of the power supply system 30 once a failure signal is detected.

Such a configuration may be referred to as "fully" redundant in the sense that, for each of the components of the power supply modules, there is a primary component and a secondary component available to power the passenger seats 130. This configuration also reduces the amount of harnessing required to implement the system 30 within an aircraft by reducing the number connectors required to establish the connections within the system 30. For example, by having each passenger seat 130 connected via a tap off of one of the plurality of CAN bus channels 140, there need only be one connector on the seat 130 in order for it to have power available from either primary power supply module 100A or secondary power supply module 100B. This reduction in harnessing reduces complexity, communication bus channels length, and weight of the overall design. Such reductions can be advantageous within the context of system for use within an aircraft where space is limited and weight reduction is a significant goal of system design.

Figure 3B:
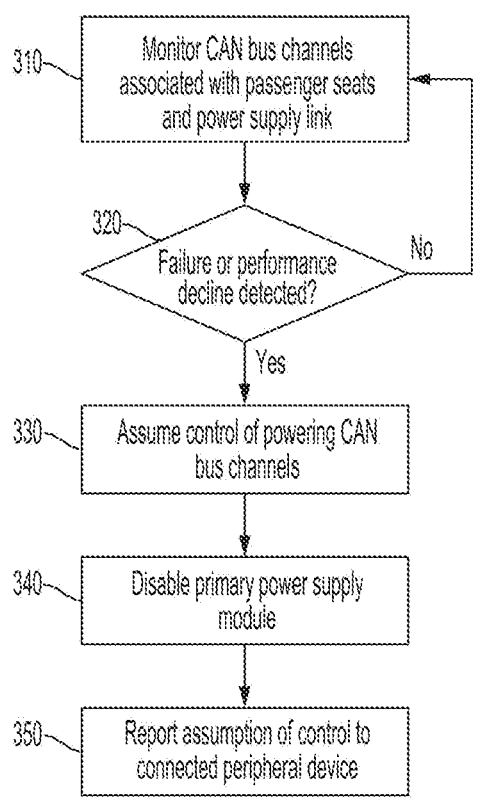
FIG. 3B is a flowchart describing the operations performed by the secondary power supply module in monitoring the operations of the primary power supply module and assuming control in the event that a failure is detected according to an embodiment of the present disclosure.
Figure 3C:
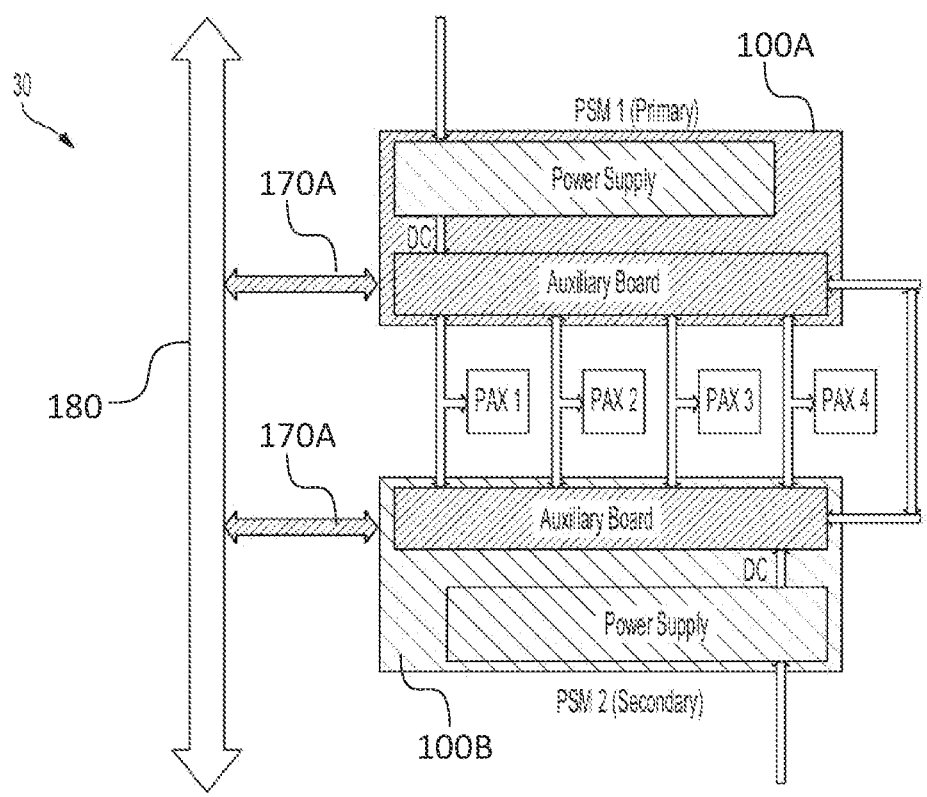
FIG. 3C is a representation of a redundant power supply system including a redundant communication link between both power supply modules of the power supply system and a peer system.

The monitoring function of the secondary auxiliary board 120B, as carried out by logic circuitry 160B, is described by the flowchart of FIG. 3B. The process begins for the secondary auxiliary board 120B at 310 by monitoring the CAN bus channels 140 associated with the connected passenger seats 130 and signals sent along the power supply link 150. The secondary auxiliary board 120B may also be configured to receive performance information regarding the primary power supply 110A from the primary auxiliary board 120A, via the linked CAN bus channels 140 or the power supply link 150, and, if necessary, preemptively assume control before a failure occurs. For example, if secondary auxiliary board 120B receives a signal that the primary power supply 110A is overheating and will experience a failure, control may be preemptively moved to the secondary auxiliary board 120B. At 320, if the secondary auxiliary board 120B determines if there is a failure to power one of the CAN bus channels 140 or if there is a performance decline from the power supply 110A of active power supply module 100A. If a failure of performance decline is not detected at 320, the process returns to 310. If a failure or a performance decline is detected at 320, then the process moves to 330 wherein the secondary auxiliary board 120B may assume control of either powering all of the seats via CAN bus channels 140 or assume control of powering only a single CAN bus channel 140 for which a failure has been detected. Following 330, the secondary auxiliary board 120B, which has now assumed control of powering the passenger seats 130, moves to 340 where a signal is sent to the primary auxiliary board 120A to disable the primary power supply 110A. This signal may be sent via one of the CAN bus channels 140 or via the power supply link 150. Finally, at 350, a signal reporting the assumption of control by the secondary auxiliary board 120B may be sent to a connected peer system, such as an in-flight entertainment system (IFE) to alert the aircraft maintenance staff of the failure.

FIG. 3C is a representation of a "fully" redundant configuration, as was depicted in FIG. 3A, but including communicative link 170A and communicative link 170B connecting the primary power supply module 100A and the secondary power supply module 100B, respectively, to a peer system 180. According to some embodiments of the present disclosure, communicative link 170 A may be connected to the auxiliary board 120A of the primary power supply module 100A. Likewise, according to some embodiments of the present disclosure, the communicative link 170B may be connected to the auxiliary board 120B of the secondary power supply module 100B. It will be understood by one skilled in the art that the peer system may be any system configured to operate in conjunction with the power supply system 30, such as but not limited to an in-flight entertainment system (IFE).

Figure 4A:
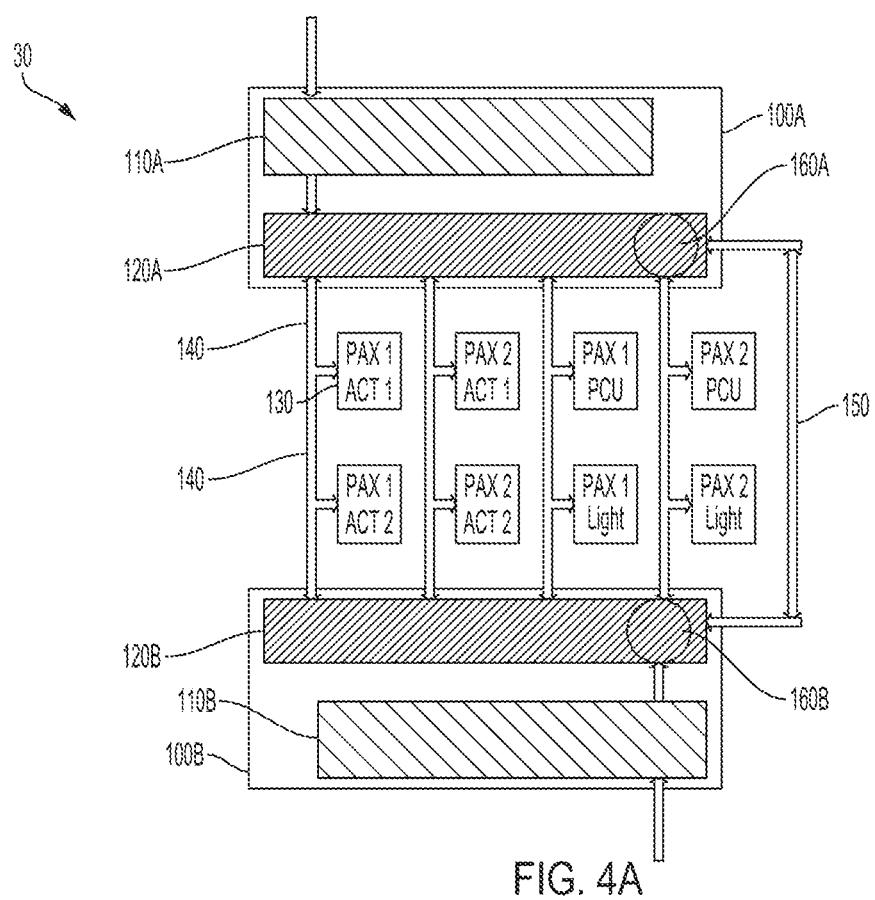
FIG. 4A is a representation of a pair of power supply modules connected to a plurality of passenger seats (PAXs) that features full redundancy in a DAL-D configuration for the actuators and a DAL-E configuration for the peripheral devices, such as the passenger control units (PCUs) and lights, according to an embodiment of the present disclosure.

FIG. 4A is a representation of a "fully" redundant power supply system 30 having a pair of passenger seats and actuators 130 connected along CAN bus channels 140 between two connected power supply modules, primary power supply module 100A and secondary power supply module 100B, in a configuration including peripheral devices connected in such a manner that the passenger seats and actuators 130 and the peripheral devices meet different DAL ratings. It will be understood by one skilled in the art that various components having different DAL ratings may be utilized according the aspects of the present disclosure. In FIG. 4A, the passenger seats and actuators 130 are depicted in a DAL-D configuration, where DAL-D refers to a safety critical rating for the components such that a failure of the component would cause only a slight reduction in safety margin or slight increase in crew workload. Additionally, peripheral devices, such as a passenger control unit (PCU) and lights, are depicted as connected in a DAL-E configuration, where DAL-E refers to a safety critical rating for the components such that a failure would have no adverse effect on the aircraft or crew workload. This configuration is provided as an example of one embodiment according to aspects of the present disclosure. Other configurations, such as those featuring passenger seats and actuators 130 configured to have a DAL-C rating, may be utilized within the scope of the present disclosure. For more information regarding DAL ratings, see generally, Radio Technical Commission for Aeronautics (RTCA), DO-178C. It will also be understood by one skilled in the art that the passive peripherals are not limited to PCUs and lights, but may include other types of peripheral devices as well that may enhance passenger comfort such as heating mats and pneumatic systems.

Within FIG. 4A, as in FIG. 3A, the passenger seats and actuators 130 are connected to the plurality of CAN bus channels 140 via taps, thereby reducing the amount of harnessing the system requires by reducing the number of connectors within the power supply system 30. Redundancy is achieved, while attempting to reduce weight and complexity, by establishing a greater number of communicative links between the primary power supply module 100A and the secondary power supply module 100B. Monitoring and control of the system 30 is maintained by the primary logic circuitry 160A and secondary logic circuitry 160B of the corresponding primary auxiliary board 120A and secondary auxiliary board 120B. Also present within the system is the power supply link 150, which connects the primary auxiliary board 120A to the second auxiliary board 120B and provides for an additional communicative link between the primary power supply module 100A and secondary power supply module 100B. The operation of the power supply system 30 is similar to that depicted in FIG. 3A, but the passenger seats and actuators 130 are depicted as individually connected along the plurality of CAN bus channels 140 in a DAL-D configuration while the peripheral devices are connected in a DAL-E configuration. As will be appreciated by one skilled in the art, peripheral devices may be developed at different DAL ratings, with lower DAL ratings generally being less expensive to manufacture. Some embodiments of the present disclosure may offer flexibility to offer configurations that have different components connected to the power supply system 30 with varying DAL ratings. This is advantageous because it allows for designs to adapt designs that require varied DAL levels within a single system in an attempt to reduce overall system cost and complexity.

Figure 4B:
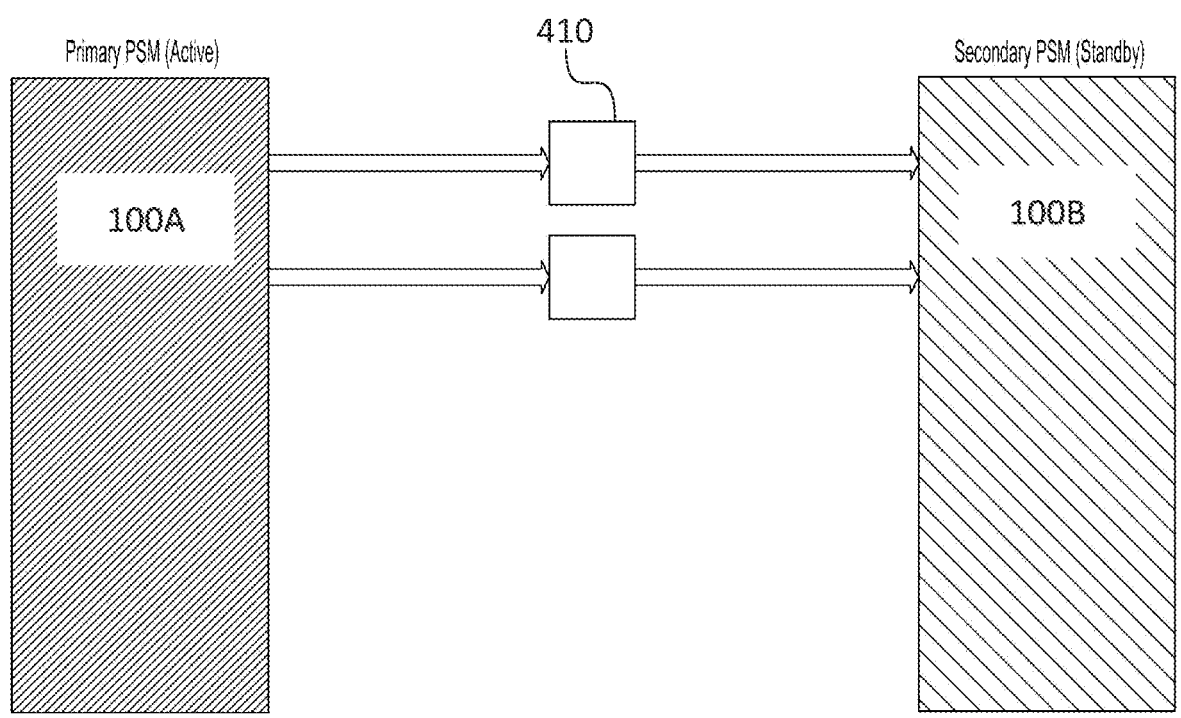
FIG. 4B is a representation of a redundant power supply configuration for a passive peripheral device according to an embodiment of the present disclosure.

FIG. 4B is a representation of a redundant power supply configuration for powering a plurality of passive peripheral devices 410. The primary power supply module 100A is connected via communication bus channels 140 to the plurality of passive devices 410. The communication bus channels are also connected to secondary power supply module 100B. During normal operation, as depicted herein, primary power supply module 100A powers the plurality of passive peripheral devices 410, and the supply of power is monitored by the secondary power supply module 100B. Not depicted, for simplicity, within FIG. 4B are the internal components of the primary power supply module 100A and the secondary power supply module 100B. Also, not depicted is the power supply link 150.

Figure 4C:
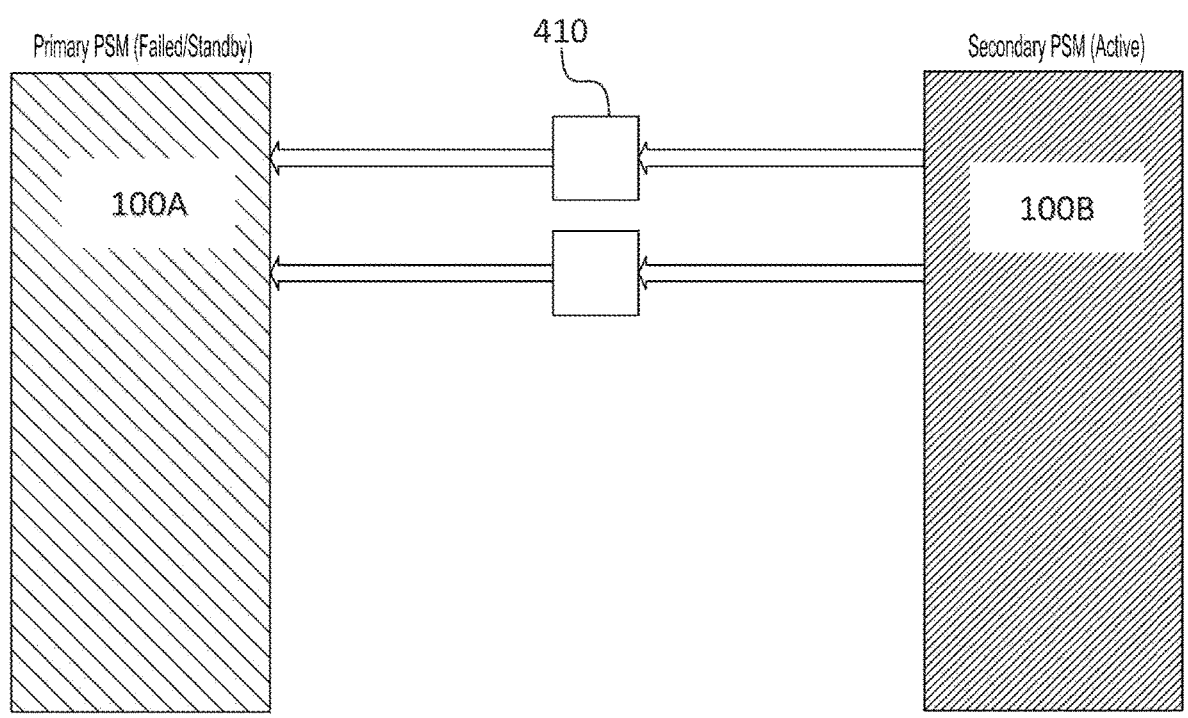
FIG. 4C is a representation of a redundant power supply configuration for a passive peripheral device during a failover event wherein the secondary power supply module has assumed control of powering the passive peripheral device according to an embodiment of the present disclosure.

FIG. 4C is a representation of the system of FIG. 4B during a failover event wherein control of powering the plurality of passive devices 410 has been assumed by the secondary power supply module 100B. As depicted, the primary power supply module 100A may assume a monitoring function after control has been assumed by the secondary power supply module 100B. However, such operation is not required, and the connection between the primary power supply module 100A and the plurality of passive peripheral devices 410 may stop being operational. Not depicted, for simplicity, within FIG. 4C are the internal components of the primary power supply module 100A and the secondary power supply module 100B. Also, not depicted is the power supply link 150.

FIGS. 3A, 3B, 4A, 4B, and 4C all illustrate the redundancy that can be achieved for power the passenger seats 130 by increasing the amount of communicative links connecting the primary and secondary components of the system 30. However, redundant control of the system can also be achieved within this type of configuration, as will be discussed below in the context of a redundant matrix scan functionality for a matrix keypad that may be included as a peripheral device of a passenger seat 130.

Figure 5:
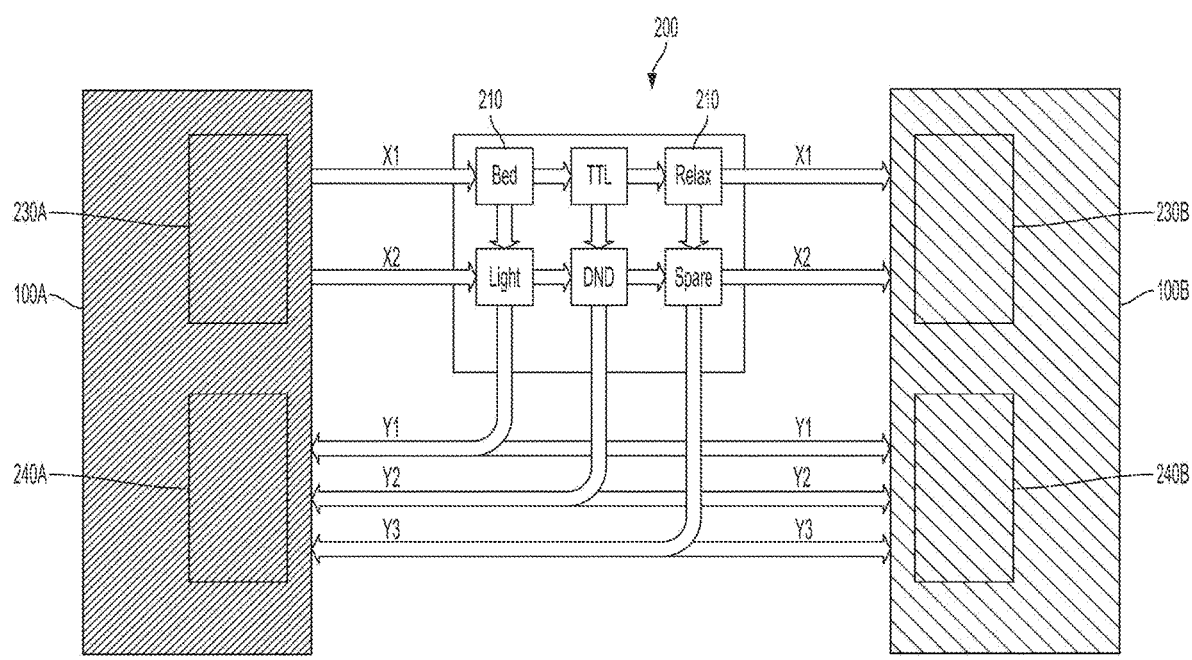
FIG. 5 is a depiction of redundant matrix scan controls according to an embodiment of the present disclosure.

FIG. 5 is a depiction of redundant configuration for a matrix keypad 200, having various switches 210, being connected between a primary and a secondary power supply module, 100A and 100B respectively, during normal operation. The various switches 210 are placed within intersecting rows and columns, thereby creating a matrix of switches with each switch 210 having a corresponding row and column position. While operating normally, the primary power supply module 100A, via its auxiliary board 120A, will scan an active signal through a first plurality of matrix scan outputs 230A to provide a detectable signal at a first plurality of matrix scan inputs 240A when switches 210 of the matrix keypad 200 are depressed. This scanned signal is also monitored by a second plurality of matrix scan outputs 230B of the secondary power supply module 100B. The second plurality of matrix scan outputs 230B may be the analogous or "paired" set of matrix scan outputs included within the secondary power supply module 100B.

The scanning signal may be supplied to the matrix keypad 200 circuit at a frequency that can be set according to the design requirements of the system. It will be understood by one skilled in the art that any suitable scanning frequency may be utilized within the scope of the present disclosure.

Redundancy is built into the matrix scan functionality by providing the second plurality of matrix scan outputs 230B, of the secondary power supply module 100B, in addition to a second plurality of matrix scan inputs 240B. As depicted in FIG. 3A, there is a "paired" set of matrix scan outputs (first plurality of matrix scan outputs 230A and second plurality of matrix scan outputs 240A) that are connected to the matrix keyboard 200. Similarly, there is a "paired" set of matrix scan inputs (first plurality of matrix scan inputs 240A and second plurality of matrix scan inputs 240B) that may receive the matrix scan signals.

While the primary power supply module 100A is operating, the matrix scan signals are provided by the first plurality of matrix scan outputs 230A and received by the first plurality of matrix scan inputs 240A. While the first plurality of matrix scan inputs 240A are receiving the matrix scan signals they are in an "active" state. If the first plurality of matrix scan inputs 240A are set to not receive the matrix scan signals, then they will be herein referred to as being in an "inactive" state. According to aspects of embodiments of the present disclosure, the active state may correspond to a lowered input impedance for the first plurality of matrix scan inputs 240A. Likewise, the inactive state may correspond to an input impedance higher than that of the active state. However, it is within the scope of the present disclosure that both the active and inactive states may correspond with high input impedance states, and that the "active" and "inactive" descriptors refer only to the matrix scan inputs being configured to receive or not receive matrix scan signals.

The second plurality of matrix scan outputs 230B of the secondary power supply module 100B can perform the same function as the first plurality of matrix scan outputs 230A of the primary power supply module 100A, and control over the matrix scanning functionality can be assumed by the second power supply module 100B by setting the second plurality of matrix scan inputs 240B from an inactive state into an active state, and correspondingly reversing the state of the first plurality of matrix scan inputs 240A of the primary power supply module 100A from the active state to the inactive state.

In the event that the secondary power supply module 1006 detects a signal dropout (loss of a control voltage signal, or lack of detected scan signal) from the primary power supply module 100A, the secondary power supply module 1006 assumes control of the monitoring and scanning functions of the matrix keypad 200 via the second plurality of matrix scan outputs 230B, and signals to the second plurality of matrix scan inputs 240B to enter into an active state. The secondary power supply module 1006 may also concurrently signal to the primary power supply module 100A to place the first plurality of matrix scan inputs 240A into an inactive state. This reversal of control is depicted in FIG. 6A.

Figure 6A:
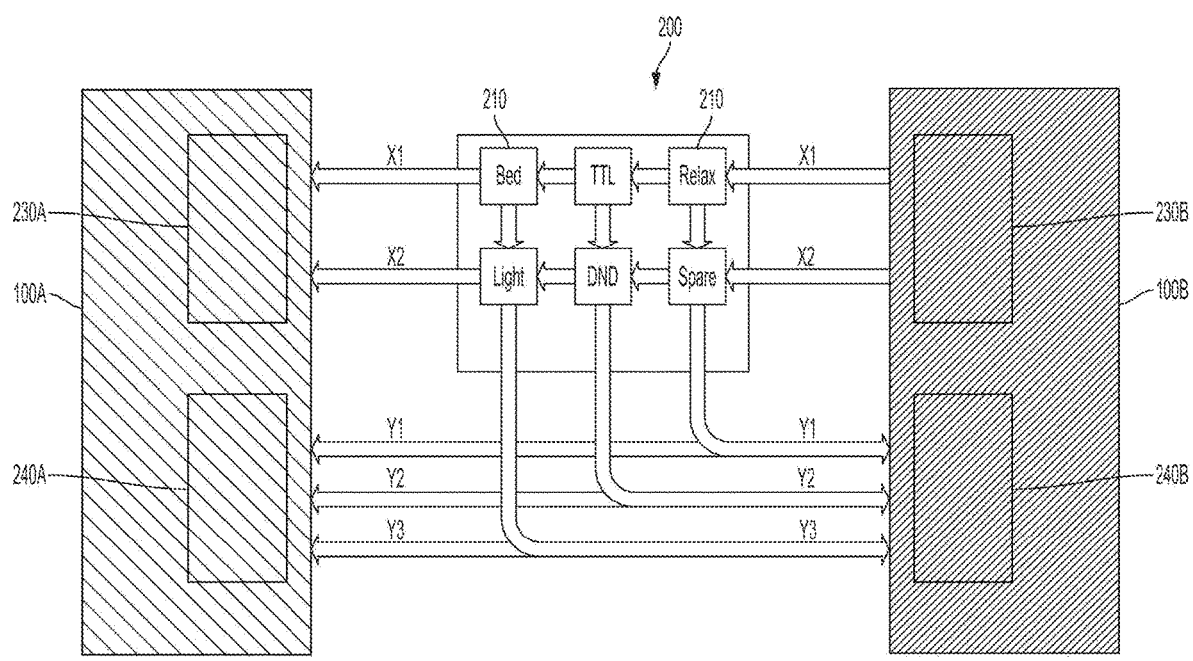
FIG. 6A is a depiction of redundant matrix scan controls during a failover mode according to an embodiment of the present disclosure.

FIG. 6A is a depiction of redundant configuration for a matrix keypad 200, having various switches 210, being connected between a primary power supply module 100A and a secondary power supply module 1006 during a failover event wherein control of the matrix scan functionality has been assumed by the secondary power supply module 1006. As described above, the secondary power supply module 1006 has assumed control of providing the signals to both the matrix keypad 200 and also to the primary power supply module 100A, which is depicted as taking on a monitoring role. This assumption of monitoring by the failed power supply module is optional, and need not be present for the redundancy of the matrix keypad 200 to operate. The input impedance state of the first plurality of matrix scan inputs 240A and the second plurality of matrix scan inputs 240B has reversed, causing the signals from the second plurality of matrix scan outputs 230B to be received by the second plurality of matrix scan inputs 240B. In this way, a failure within primary power supply module 100A will not cause a loss of function of the matrix keypad 200 because the matrix scan functionality can be carried out by the second plurality of matrix scan outputs 230A and the second plurality of matric scan inputs 240B of the secondary power supply module 100B.

Figure 6B:
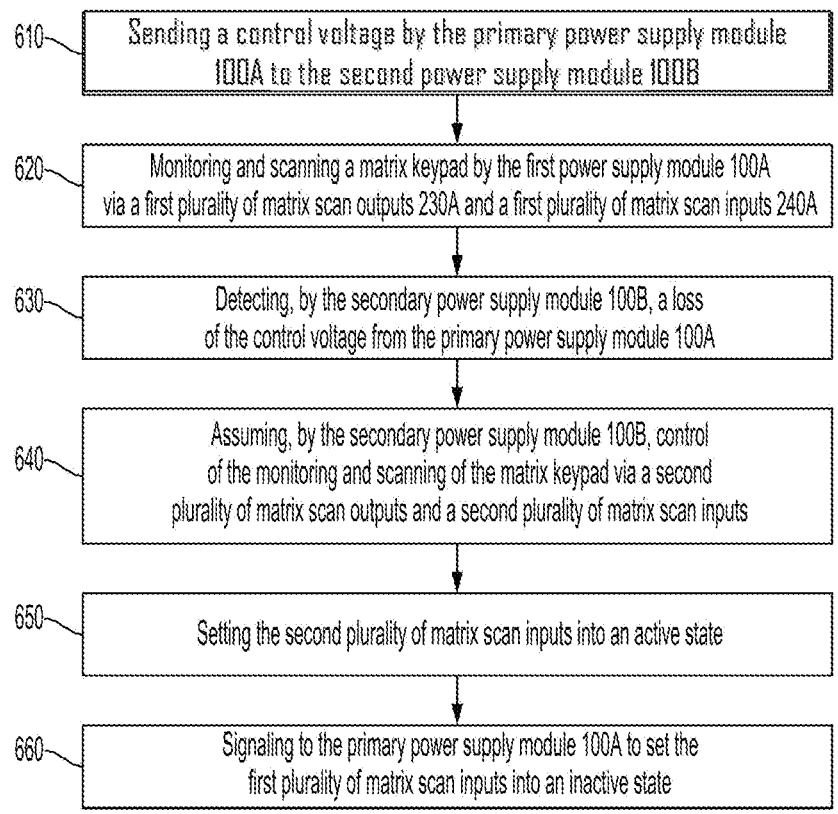
FIG. 6B provides a flowchart describing the method according to one embodiment of the present disclosure of switching control of the matrix monitoring and scanning operations to the secondary power supply module in the event of a loss of the control voltage signal being sent from the primary power supply module.

FIG. 6B provides a flowchart describing the method of switching control of the matrix monitoring and scanning operations to the secondary power supply module 100B in the event of a loss of the control voltage signal being sent from the primary power supply module 100A. The method begins at 610, with the primary power supply module 100A sending a control voltage signal via the power supply link 150 to the secondary power supply module 100B. Then, at 620, the first power supply module 100A provides monitoring and scanning operations to a matrix keypad 200 via a first plurality of matrix scan outputs 230A and a first plurality of matrix scan inputs 240A. This is the normal mode of operation for the matrix keypad. At 630, the detection of loss of the matrix scan signal is detected by the secondary power supply module 100B. Then, at 640, the secondary power supply module 100B assumes control of the monitoring and scanning of the matrix keypad 200 via the second plurality of matrix scan outputs 230B and the second plurality of matrix scan inputs 240B. Concurrent with 640, the method at 650 has the secondary power supply module 100B set the second plurality of matrix scan inputs 240B into an active state. This allows for signals to be received by the second plurality of matrix scan inputs 240B. Finally, at 660, the secondary power supply module 100B signals to the primary power supply module 100A to set the first plurality of matrix scan inputs 230A into an inactive state (e.g., a disabled state or a high input impedance state). It will be understood by one skilled in the art that in the event the primary power supply module 100A is inoperative due to a failure, the operations included at 660 may be omitted. Thus, following the method of FIG. 6B, the secondary power supply module 100B has detected a loss of the matrix scan signal, and switched control of the matrix keypad 200 monitoring and scanning operations to the secondary power supply module 100B components. This provides redundancy for the matrix keypad 200 in the event that the primary power supply module 100A has a failure.

The above description of the circuit topologies for redundant power supply system 30 and redundant operation for a matrix scan keypad 200 both rely on the same design parameter of providing linked pairs of components to the passenger seats 130 and matrix keypad 200. This enables logic circuitry built into the primary auxiliary board 120A and secondary auxiliary board 120B of the primary power supply module 100A and secondary power supply module 100B, respectively, to shift operation to the secondary units when a failure or performance decline is detected in one of the primary components. Moreover, linking the primary power supply 110A and secondary power supply 110B via the power supply link 150 at the auxiliary boards level, while also using linked communication bus channels 140 to connect the passenger seats 130 between the primary auxiliary board 120A and secondary auxiliary board 120B, provides a "fully" redundant power supply system 30. Likewise, by providing the matrix scan functionality to both primary auxiliary board 120A and secondary auxiliary board 120B, a matrix keypad 200 connected between the auxiliary boards can have redundant operation by switching control to the secondary matrix scan outputs 230B and reversing the input impedance states of the first plurality of matrix scan inputs 240A and the second plurality of matrix scan inputs 240B.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

While this invention has been described in detail with particular references to illustrative embodiments thereof, the embodiments described herein are not intended to be exhaustive or to limit the scope of the invention to the exact forms disclosed. For example, although the various embodiments are described in the context of aircraft seat and suite control, the embodiments may extend to types of seat and suite control, such as, for example, seat and suite control in automobiles, trains, or moving vehicles as will be appreciated by a person of skill in the art. Persons skilled in the art and technology to which this invention pertains will thus appreciate that alterations and changes in the described structures and methods of assembly and operation can be practiced without meaningfully departing from the principles, spirit, and scope of this invention, as set forth in the following claims and equivalents thereof.

What is claimed is:

1. A redundant power supply system for aircraft seats, comprising:
    a first power supply module comprising a first AC to DC power converter configured to supply power to a first auxiliary board, the first auxiliary board being configured to supply power to a plurality of aircraft seats via a plurality of communication bus channels;
    a second power supply module comprising a second AC to DC power converter configured to supply power to a second auxiliary board, the second auxiliary board being configured to supply power to the plurality of aircraft seats via the plurality of communication bus channels;
    a power supply link configured to connect the first auxiliary board and the second auxiliary board enabling the first AC to DC power converter to power the second auxiliary board via the power supply link;
    a first logic circuit located within the first auxiliary board and configured to monitor a performance of the redundant power supply system; and
    a second logic circuit located within the second auxiliary board,
    wherein the first logic circuit is communicatively linked to the second logic circuit via the power supply link, and the communication bus channels, and the second logic circuit is configured to assume control of monitoring the performance of the redundant power supply system from the first logic circuit after receiving a signal via the power supply link or the communication bus channels from the first logic circuit, and
    wherein each of the communication bus channels of the plurality of communication bus channels form a communicative link between the first auxiliary board and the second auxiliary board.

2. The redundant power supply system for aircraft seats of claim 1, wherein the first power supply module is configured to power the first auxiliary board and the plurality of aircraft seats as a primary power supply module.

3. The redundant power supply system for aircraft seats of claim 2, wherein the second auxiliary board is configured to:
    monitor the performance of the first power supply module; and
    in response to detecting a decline in the performance of the first power supply module, begin powering one or more of the plurality of aircraft seats via the second power supply module.

4. The redundant power supply system for aircraft seats of claim 2, wherein the second auxiliary board is configured to:
    monitor a signal on each of the plurality of communication bus channels; and
    in response to detecting a loss of the signal on one or more of the plurality of communication bus channels, begin powering one or more of the plurality of aircraft seats.

5. A redundant power supply system for aircraft seats, comprising:
    a first power supply module comprising a first AC to DC power converter and a first auxiliary board configured to supply power to a plurality of aircraft seats via a plurality of communication bus channels;
    a second power supply module comprising a second AC to DC power converter and a second auxiliary board configured to supply power to the plurality of aircraft seats via the plurality of communication bus channels;
    a power supply link configured to connect the first AC to DC power converter and the second AC to DC power converter enabling the first AC to DC power converter to power one or both of the first and second auxiliary boards;
    a first logic circuit located within the first auxiliary board and configured to monitor a performance of the redundant power supply system; and
    a second logic circuit located within the second auxiliary board,
    wherein the first logic circuit is communicatively linked to the second logic circuit via the power supply link, and the communication bus channels, and the second logic circuit is configured to assume control of monitoring the performance of the redundant power supply system from the first logic circuit after receiving a signal via the power supply link or the communication bus channels from the first logic circuit, and
    wherein each of the communication bus channels of the plurality of communication bus channels form a communicative link between the first auxiliary board and the second auxiliary board.

6. A redundant power supply system for a plurality of passive aircraft seat peripherals, comprising:
    a first power supply module comprising a first AC to DC power converter and a first auxiliary board configured to supply power to a plurality of passive aircraft seat peripherals via a plurality of communication bus channels;
    a second power supply module comprising a second AC to DC power converter and a second auxiliary board configured to supply power to the plurality of passive aircraft seat peripherals via the plurality of communication bus channels;
    a power supply link configured to connect the first AC to DC power converter and the second AC to DC power converter enabling the first AC to DC power converter to power one or both of the first and second auxiliary boards;
    a first logic circuit located within the first auxiliary board and configured to monitor a performance of the redundant power supply system; and
    a second logic circuit located within the second auxiliary board,
    wherein the first logic circuit is communicatively linked to the second logic circuit via the power supply link, and the communication bus channels, and the second logic circuit is configured to assume control of monitoring the performance of the redundant power supply system from the first logic circuit after receiving a signal via the power supply link or the communication bus channels from the first logic circuit,
    wherein each of the communication bus channels of the plurality of communication bus channels form a communicative link between the first auxiliary board and the second auxiliary board.

7. The redundant power supply system for a plurality of passive aircraft seat peripherals of claim 6, wherein the second power supply module is configured to, in response to receiving a signal via the plurality of communication bus channels that the first power supply module has experienced a failure, assume control of supplying power to the plurality of passive aircraft seat peripherals using the second auxiliary board.

8. The redundant power supply system for a plurality of passive aircraft seat peripherals of claim 6, wherein the second power supply module is configured to, in response to receiving a signal via the power supply link that the first power supply module has experienced a failure, assume control of supplying power to the plurality of passive aircraft seat peripherals using the second auxiliary board.

* * * * *